US012476375B2

(12) United States Patent
Evtyushkin et al.

(10) Patent No.: US 12,476,375 B2
(45) Date of Patent: Nov. 18, 2025

(54) MM-WAVE RESONANT TERMINATION LOAD EMBEDDED IN A PCB SUBSTRATE AND ANTENNA ARRAY INCLUDING THE SAME

(71) Applicant: SAMSUNG ELECTRONICS CO., LTD., Suwon-si (KR)

(72) Inventors: Gennadiy Aleksandrovich Evtyushkin, Moscow (RU); Elena Aleksandrovna Shepeleva, Moscow (RU); Anton Sergeevich Lukyanov, Moscow (RU)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 108 days.

(21) Appl. No.: 18/486,752

(22) Filed: Oct. 13, 2023

(65) Prior Publication Data

US 2024/0136718 A1 Apr. 25, 2024

Related U.S. Application Data

(63) Continuation of application No. PCT/KR2023/015869, filed on Oct. 13, 2023.

(30) Foreign Application Priority Data

Oct. 14, 2022 (RU) .......................... RU2022126824

(51) Int. Cl.
*H01Q 9/04* (2006.01)
*H01Q 21/06* (2006.01)

(52) U.S. Cl.
CPC ......... *H01Q 9/0435* (2013.01); *H01Q 21/065* (2013.01)

(58) Field of Classification Search
CPC .... H01Q 1/523; H01Q 9/0414; H01Q 9/0435; H01Q 9/045; H01Q 9/0457; H01Q 21/065
See application file for complete search history.

(56) References Cited

U.S. PATENT DOCUMENTS 4,737,747 A 4/1988 Henderson et al.
4,926,189 A 5/1990 Zaghloul et al.
(Continued)

FOREIGN PATENT DOCUMENTS

CN 110600872 12/2019
CN 111403917 7/2020
(Continued)

OTHER PUBLICATIONS

Search Report and Written Opinion dated Jan. 22, 2024 issued in International Patent Application No. PCT/KR2023/015869.
(Continued)

*Primary Examiner* — Raymond R Chai
(74) *Attorney, Agent, or Firm* — Nixon & Vanderhye, P.C.

(57) ABSTRACT

An antenna array is provided that includes at least one active element and at least one passive element arranged around the active element. The passive element includes at least one feeding line disposed between a first ground layer and a second ground layer, a first patch located on the same plane as the first ground layer, and a second patch at least partially disposed between the feeding line and the first patch. The second patch is configured to be electromagnetically coupled to both the first patch and the feeding line. A radio-absorbing material is disposed adjacent to the first patch to improve electromagnetic performance.

11 Claims, 8 Drawing Sheets

(56) References Cited

U.S. PATENT DOCUMENTS

| | | | | |
|---|---|---|---|---|
| 9,620,464 | B2 * | 4/2017 | Baks | H01Q 9/0457 |
| 9,905,899 | B2 | 2/2018 | Ju | |
| 10,003,115 | B2 | 6/2018 | Uemichi | |
| 10,727,595 | B2 | 7/2020 | Liu et al. | |
| 10,777,895 | B2 | 9/2020 | Paulotto et al. | |
| 11,777,221 | B2 * | 10/2023 | Ueda | H01Q 5/42<br>343/702 |
| 2003/0020657 | A1 | 1/2003 | Sakamoto et al. | |
| 2010/0073238 | A1 | 3/2010 | Jun et al. | |
| 2011/0090027 | A1 | 4/2011 | Mangaiahgari | |
| 2019/0013590 | A1 * | 1/2019 | Rowell | H01Q 3/267 |
| 2019/0207305 | A1 | 7/2019 | Hashimoto et al. | |
| 2020/0295454 | A1 | 9/2020 | Yun et al. | |
| 2021/0126366 | A1 | 4/2021 | Sudo et al. | |
| 2021/0280964 | A1 * | 9/2021 | Hong | H01Q 21/062 |
| 2021/0367344 | A1 * | 11/2021 | Kimura | H01Q 19/005 |

FOREIGN PATENT DOCUMENTS

| | | | |
|---|---|---|---|
| JP | 11-330847 | | 11/1999 |
| JP | 2009147600 | A | 7/2009 |
| KR | 10-2010-0119528 | | 11/2010 |
| RU | 2049367 | C1 | 11/1995 |
| WO | 2008146535 | A1 | 12/2008 |
| WO | 2023068479 | A1 | 4/2023 |

OTHER PUBLICATIONS

Office Action for RU2022126824, dated May 2, 2023, 8 pages.

Extended Search Report dated Aug. 8, 2025 in European Application No. 23877762.7.

* cited by examiner

MM-WAVE RESONANT TERMINATION LOAD EMBEDDED IN A PCB SUBSTRATE AND ANTENNA ARRAY INCLUDING THE SAME

CROSS-REFERENCE TO RELATED APPLICATIONS

This application is a continuation of International Application No. PCT/KR2023/015869 designating the United States, filed on Oct. 13, 2023, in the Korean Intellectual Property Receiving Office and claiming priority to Russian Patent Application No. 2022126824 filed on Oct. 14, 2022, in the Russian Patent Office, the disclosures of each of which are incorporated by reference herein in their entireties.

BACKGROUND

Field

The disclosure relates to radio engineering, for example to a termination load embedded in a printed circuit board substrate and antenna array including the termination load.

Description of Related Art

The constantly rising needs of users cause rapid development of communication technologies. Currently, there is an active development of promising 5G and 6G communication networks, which will be characterized by higher performance indicators, such as high speed and volume of data transmission, energy efficiency.

New applications require a new class of radio systems capable of transmitting/receiving data/energy and capable of adaptively changing the characteristics of the radiated electromagnetic field. An important component of such systems are steerable antenna arrays, which find their application in data transmission systems such as 5G (28 GHz), WiGig (60 GHz), Beyond 5G (60 GHz), 6G (sub THz), Long-distance wireless power transmission systems (LWPT) (24 GHz), automotive radar systems (24 GHz, 79 GHz), etc.

Millimeter-wave antenna arrays used in these areas must meet several main requirements:

- low losses and high gain;
- beam flexible steering (direction of maximum radiation), e.g. beam scanning and focusing the emitted field in a wide range of angles;
- compact, cheap, simple design applicable for mass production.

Currently, when creating millimeter-wave radiators, the technology of printed circuit boards (PCB) is widely used, since this technology makes it possible to obtain devices characterized by simplicity of design and producibility, ease of integration on a single substrate with other electronic assemblies, the ability to achieve a wide bandwidth of operating frequencies.

Additional requirements to antenna arrays are low side lobes and a high efficiency factor, which improve system noise resistance and signal-to-noise ratio. For this purpose, it is necessary to suppress parasitic radiation that occurs in antenna arrays due to edge effects amongst other things. For suppression of parasitic radiation caused by diffraction of the array edge surface wave, the edge active elements of the antenna array are surrounded by passive elements that are loaded on the termination loads. Termination loads can be implemented as a termination load—the so-called “terminator”—or in the form of a standard resistor. Such termination loads are also used in passive feeding devices (e.g. power dividers) where the divider inner ports should be loaded on terminators for suppression of multiple reflected waves. However, standard resistors and terminators cannot be used at extremely high frequencies (e.g. higher 100 GHz). Small sizes of antenna arrays designed to operate in 5G and 6G communication standards do not allow for placement of the lumped terminators. The realization of terminators in the inner layers of a printed circuit board (PCB) is also difficult due to the extremely strong tolerances for 6G frequency band.

Outer elements of array are often used to improve the parameters of the whole antenna array by loading these elements with the matched terminators (termination loads). There are surface waves the array aperture during operation. These waves, reflected from the edges of the antenna array, distort the radiation pattern of the array that leads to grow of side lobes and increases the back radiation level due to diffraction effects. In the case of the antenna array surrounded by passive elements with matched terminators, surface waves are intercepted by the passive elements and has no negative impact on the radiation pattern of the antenna array.

However, the existing approaches for realization of termination load in multilayer antenna array PCBs have a number of drawbacks:

- significant installation space required;
- structure complexity;
- high production cost;
- long fabrication process;
- cannot be implemented in;
- cannot be implemented at operating frequencies over 80 GHz;
- the inner film resistor cannot be realized for an organic dielectric, because film resistors are realized on the basis of ceramic substrates (Low Temperature Co-Fired Ceramic, LTCC) using special resistive pastes covered in high-temperature processes.

A prior art solution is known, disclosed in document U.S. Pat. No. 9,905,899 B2, which is a terminator formed as film resistor with matching circuit on the basis of a microstrip line. However, this solution cannot be realized as a termination load for multilayer PCBs. Furthermore, additional space is required for disposition of the matching circuit.

Document U.S. Pat. No. 10,003,115 B2 discloses a terminator for the inner PCB layers. According to this solution, an electromagnetic wave is received by a probe into the waveguide and directed to a lumped terminator on the PCB surface by an outer stripline. However, this solution requires a lumped resistor and its mounting, which is not possible for frequencies above 100 GHz.

Document U.S. Pat. No. 4,737,747 discloses terminator assembly process for inner PCB layers. An absorbing resistive element is mounted on one side of the first PCB, and a feeding line is provided on the top side of the other PCB. Then both PCBs are assembled together. However, this structure has to be assembled from two PCBs, which significantly degrades the matching accuracy.

Therefore, there is currently a need for a compact, reliable, simple and inexpensive antenna array termination load that provides low side lobes and a high efficiency factor, which positively affects the quality of the antenna array (speed and reliability of data transmission).

SUMMARY

Embodiments of the disclosure address at least some of the above problems.

According to an example embodiment, there is provided a termination load embedded in a printed circuit board, wherein the termination load comprises: a fragment of at least one feeding line, a transitional patch, a top resonator patch, a top metal ground layer coplanar with the top patch, wherein a gap between the top resonator patch and the top metal layer is filled with a resistive material, said fragment of the at least one feeding line terminates in the termination load in the form of an excitation probe, said at least one feeding line is disposed in the printed circuit board between the bottom ground layer of the printed circuit board and the top layer of the printed circuit board, in which the top resonator patch, the resistive material and the top metal layer are disposed, the transitional patch is disposed in the printed circuit board between the layer in which at least one feeding line is disposed and said top layer, the excitation probe, the transitional patch and the top resonator patch are coupled to each other by electromagnetic coupling.

According to an example embodiment, the resistive material in the gap between the top resonator patch and the top metal layer comprises a resistive film.

According to an example embodiment, the size of the top resonator patch is less than $$\frac{\lambda}{2\sqrt{\varepsilon}},$$

where ε is the permittivity of the printed circuit board substrate, λ is the wavelength of the emitted/received signal in free space.

According to an example embodiment, a termination load embedded in a printed circuit board is provided, wherein the termination load comprises: a fragment of at least one feeding line, a transitional patch, a top resonator patch, a top metal ground layer coplanar with the top patch, said fragment of the at least one feeding line terminating in the termination load in the form of an excitation probe, said at least one feeding line is disposed in the printed circuit board between the bottom ground layer of the printed circuit board and the top layer of the printed circuit board, in which the top resonator patch and the top metal layer are located, the transitional patch is disposed in the printed circuit board between the layer in which at least one feeding line is disposed and said top layer, wherein the excitation probe, the transitional patch and the top resonator patch are coupled to each other by electromagnetic coupling, wherein a volume radio-absorbing material or radio-absorbing coating is disposed over the top layer of the printed circuit board.

According to an example embodiment, the radio-absorbing coating comprises a radio-absorbing painting or a radio-absorbing adhesive.

According to an example embodiment, the size of the top resonator patch is about $$\frac{\lambda}{2\sqrt{\varepsilon}},$$

where ε is the permittivity of the printed circuit board substrate, λ is the wavelength of the emitted/received signal in free space.

According to an example embodiment, the termination load comprises fragments of two feeding lines located orthogonally to each other.

According to an example embodiment, the size of the transitional patch is about $$\frac{\lambda}{4\sqrt{\varepsilon}}.$$

According to an example embodiment, the transitional patch has an axisymmetric shape selected from the following options: square, circle, square with a slot in the center.

According to an example embodiment, the perimeter of the termination load is surrounded by a plurality of plated through holes (VIA), wherein the distance between the plurality of VIAs does not exceed $$\frac{\lambda}{4\sqrt{\varepsilon}}.$$

According to an example embodiment, an antenna array is provided, the antenna array comprising: active antenna elements and a plurality of passive antenna elements located around the perimeter of the active antenna elements, each of the passive antenna elements being loaded by a feeding line on a termination load in accordance with the present disclosure.

According to an example embodiment, a power divider is provided, the power divider comprising the termination load in accordance with the present disclosure.

Various embodiments of the present disclosure make it possible to provide high efficiency of the antenna array, e.g. improve the reliability and speed of wireless data transmission by absorbing the energy of spurious signals in antenna arrays using a termination load with a simple and reliable architecture and compact size.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The various example embodiments of the present disclosure are not limited to the embodiments described herein, based on the information set forth in the description and knowledge of the prior art, those skilled in the art will appreciate various embodiments which are not apart from the essence and scope of this disclosure.

Figure 1:
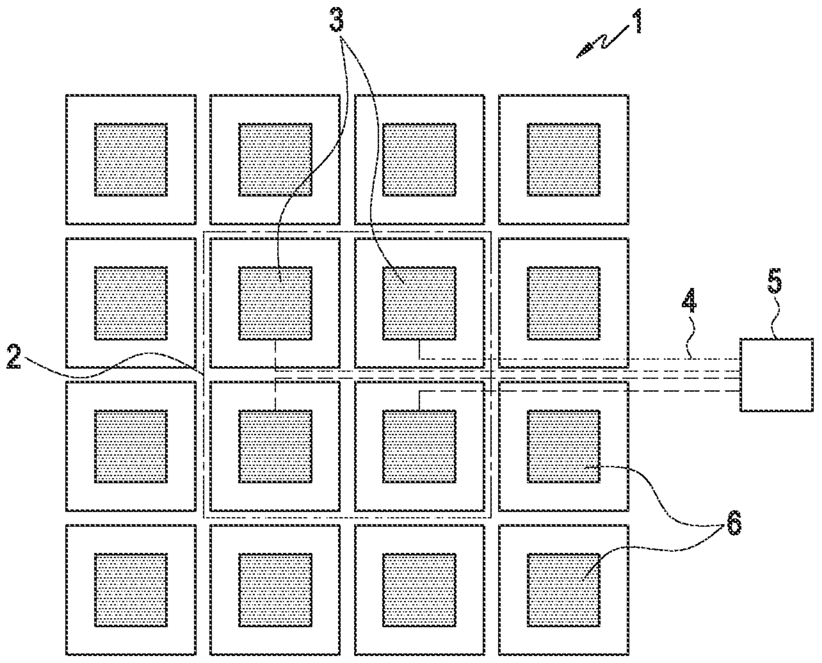
FIG. 1 is a diagram illustrating an example antenna array according to various embodiments.

As shown in FIG. 1, an antenna structure 1 according to an example embodiment comprises a printed circuit board with at least one antenna array 2 located thereon, including antenna elements 3. The antenna elements 3 may include active patch emitters, on which signals are transmitted from the control circuit 5 (integrated circuit, RFIC) via the control lines 4. The electromagnetic field radiated from the antenna elements 3 generates radiation with a high directivity. Most of the energy of the electromagnetic field is used to form the beam of the antenna array. However, during the operation of antenna elements surface waves also arise, which propagate along the aperture of the antenna array and, reflecting from the edge and interfering with the main wave, distort the antenna pattern. As a result, the side lobes increase and the antenna gain decreases, that leads to a decrease in the signal reception and transmission range, a decrease in noise immunity and channel speed. In addition, distortion of the radiation pattern leads to a greater likelihood of receiving interference from unwanted directions.

Figure 2:
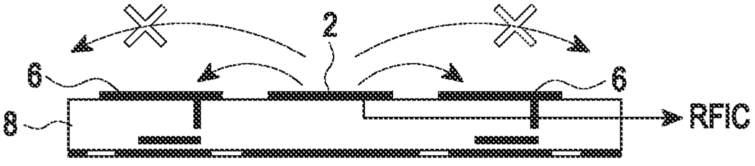
FIG. 2 is a diagram illustrating a principle of absorption of surface waves in the antenna array of FIG. 1.

To prevent and/or reduce the above undesirable effects, passive shielding elements 6 (e.g., dummy elements) are arranged around the antenna array 2 (see FIGS. 1 and 2). The shielding elements 6 are made in the form of patch elements and are loaded on termination loads 7 (see FIG. 3A) embedded in the printed circuit board 8 to ensure the absorption of interference signals. Thus, the surface waves and interference are absorbed by the shielding elements 6 (see FIG. 2) and do not affect the functioning of the antenna.

The implementation of the antenna structure on a printed circuit board can reduce the complexity of manufacturing. In addition, in the printed version, the design of the antenna can be easily changed to the required configuration of the printed circuit board.

Figure 3A:
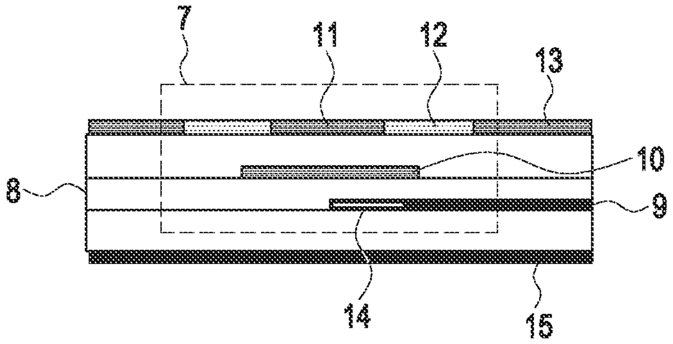
FIG. 3A is a diagram illustrating a side view of a fragment of a printed circuit board containing the termination load according to various embodiments.
Figure 3B:
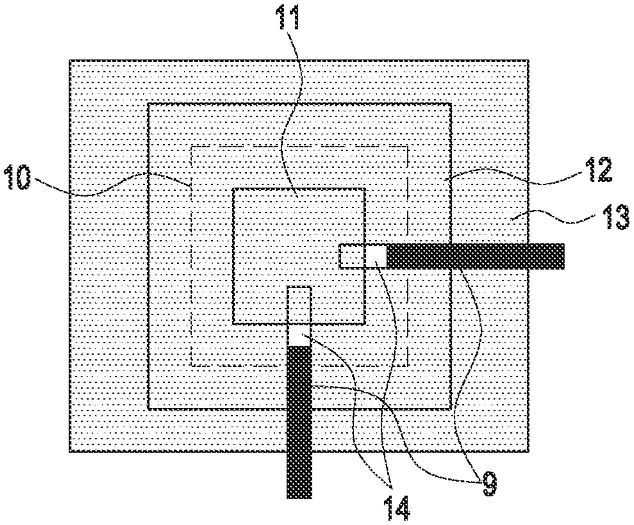
FIG. 3B is a diagram illustrating a top view of a printed circuit board fragment containing the termination load according to various embodiments.

FIGS. 3A and 3B illustrate an example PCB-integrated termination load according to various embodiments.

The termination load 7 embedded in the printed circuit board 8, according to various embodiments illustrated, for example, in FIGS. 3A and 3B, comprises a fragment of at least one feeding line 9, a transitional (auxiliary) patch (printed element) 10, top resonator patch 11, resistive material 12 surrounding top resonator patch 11, top metal (ground) layer 13 coplanar with top patch 11, with resistive material 12 disposed to fill the gap between top resonator patch 11 and top metal layer 13.

The resistive material 12 according to various embodiments may include a resistive film.

At least one feeding line 9 terminates in the termination load in the form of an excitation probe 14 (L-probe). The at least one feeding line 9 is located in the printed circuit board 8 between the bottom ground layer 15 and the top layer in which the top resonator patch 11, the resistive film 12 and the top metal layer 13 are located.

A transitional patch 10 is located in the printed circuit board 8 between the layer in which at least one feeding line is located and the top layer.

As described above with reference to FIGS. 1 and 2, the active elements 3 of the antenna array 2 emit electromagnetic radiation which has a component of surface waves propagating along the aperture of the antenna array. Passive shielding elements 6 located along the perimeter of the antenna array 2 receive the surface waves. The shielding elements 6 are loaded on the termination loads 7 by feeding lines 9. The surface wave energy is transmitted via the feeding line 9 from the shielding element 6 to the excitation probe 14, which excites the transitional patch 10. The transitional patch 10 is electromagnetically coupled to the top resonator patch 11, which is surrounded by a resistive film 12. The energy concentrated in the top patch 11 is absorbed by the resistive film 12. Thus, the energy of parasitic surface waves is absorbed by the termination load 7.

The excitation probe 14 may be contactlessly coupled to the transitional patch 10. The excitation probe 14 excites the top resonator patch 11 through the transitional patch 10 by, for example, electromagnetic coupling. Thus, in the present disclosure, there is no need to use a conductive plated through hole (VIA), which in the conventional solutions is used to transfer power between the feeding line on the inner layers of the PCB and the termination load.

Figure 4:
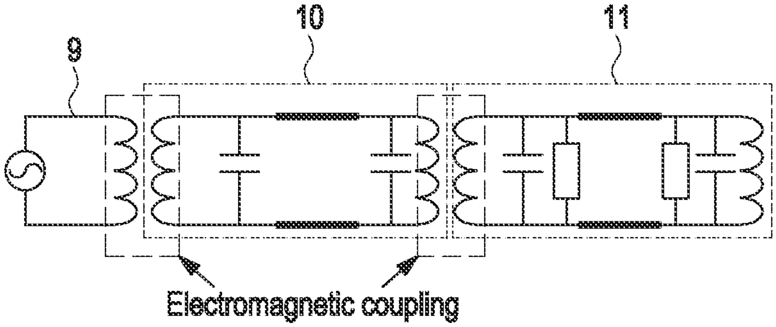
FIG. 4 is an equivalent circuit of the contactless connection of the feeding line, the transitional patch, and the top resonator patch according to various embodiments.

The equivalent circuit for the contactless connection of the feeding line 9, the transitional patch 10, and the top resonator patch 11 shown in FIG. 4 illustrates the principle of operation of the disclosed configuration of the termination load. The transitional patch 10 is electromagnetically coupled to the excitation probe 14 of the feeding line 9 and the top resonator patch 11. This electromagnetic coupling is equivalent to the operation of a transformer and does not require a galvanic connection. The resistors in the resonator patch equivalent circuit of FIG. 4 denote a resistive film 12 that absorbs energy. Due to the optimal dimensions, the transitional patch 10 and the top resonator patch 11 with the resistive layer 12 have a good match, and as a result, the electromagnetic energy from the feeding line 9 is substantially completely absorbed, since the top resonator patch 11 is a low-Q resonator due to the presence of a resistive film (film resistor).

As described above with reference to FIGS. 3A and 3B, the termination load 7 according to an example embodiment includes two feeding lines 9 arranged orthogonally to each other. The orthogonal feeding lines transmit signal energy with different polarizations (e.g., horizontal and vertical polarization). Due to the orthogonal arrangement of these lines, the fields excited by them in the resonator patch are also orthogonal to each other and, as a result, are not related to each other. Thus, the termination load can absorb the energy of two orthogonal channels at once, e.g. one termination load has the ability to work with two independent ports, which makes the embodiments of the disclosure very attractive for use in compact devices. Thus, the disclosed embodiments make it possible to reduce the required number of termination loads in multi-channel devices and, therefore, provide a compact, simple and low-cost structure. At the same time, in an example embodiment, the termination load may include a single feeding line, for example, when the device is designed to operate with a single polarization.

The resistive film 12 according to an example embodiment may comprise a low conductivity material such as "Aquadag E" having a resistivity of about 1000 ohms/□ (ohms per square), for example. The thickness of the resistive film 12 in an example embodiment may be selected to be in the range of 5-30 microns. This thickness is commensurate with the thickness of the metallization of the top layer of the printed circuit board, which facilitates the process of its application into the gap between the top resonator patch 11 and the bottom metal layer 13. Due to the resonance effect, described in greater detail below, a large amount of energy is accumulated around the top resonator patch 11. Maximum voltage distributed along the edges of the patch 11, perpendicular to the feeding line 9. This voltage between the edge of the patch 11 and the top metal ground layer 13 causes current to flow in the resistive film 12 and the energy of the current flow to be converted into thermal energy by the resistive film 12.

In known termination loads, the principle of operation is to absorb electromagnetic energy as dissipative losses in low conductive materials, which generally require a ceramic substrate and a high temperature deposition treatment (baking treatment). Unlike the known solutions, the present disclosure involves the deposition and drying of the resistive material at low temperature, which allows it to be used for cheap organic PCB substrates.

In addition, the resistive film of the present disclosure has no parasitic reactance, and therefore does not require additional matching circuits or components.

Figure 5:
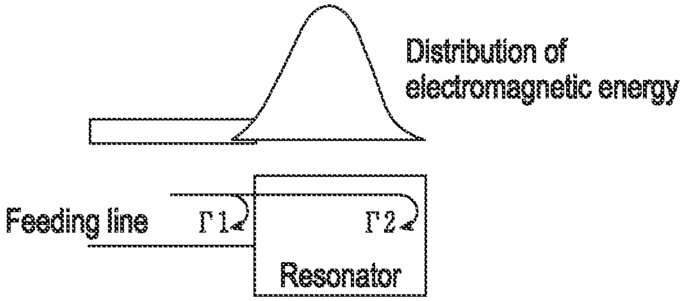
FIG. 5 is a diagram illustrating the accumulation of energy in the resonator patch according to various embodiments.

With reference to FIG. 5, the principle of energy absorption by the termination load based on the operation of a resonator will be described.

In accordance with the present disclosure, the top resonator patch 11 is a resonator that stores the energy transmitted from the transitional patch 10. In order to store electromagnetic energy through the resonator, the following condition is met:

$$\Gamma 1 = -\Gamma 2$$

where Γ1 is the reflection coefficient of the first edge of the resonator, and Γ2 is the reflection coefficient of the second edge of the resonator.

The fulfillment of the above condition is ensured by setting the required longitudinal size of the resonator (usually half the wavelength in the resonator) and the amount of coupling between the line and the resonator.

The energy accumulated by the resonator is:

$$W = \frac{PQ}{2\pi},$$

where P is the power absorbed in one period, and Q is the quality factor of the resonator, and $$P = \frac{V^2}{R},$$

where V is electric field voltage in the resonator, R is the equivalent resistivity of the resistive film.

Because two reflected waves cannot propagate in the same direction (back to the generator) due to antiphase, the energy is "pumped" in the volume of the resonator itself. The voltage amplitude in it is much higher than the amplitude of the input wave (see FIG. 5). The process stabilizes when the input power is balanced by the loss power, since the higher the field level in the resonator, the greater the loss is. This accumulated power is absorbed by the resistive film.

Thus, the stored energy increases the absorption as the voltage rises. The inventors have found that the desired value of P can be achieved with any value of R (and suboptimal too) by varying the value of Q. Thus, to use low temperature resistive materials, the resistivity does not have to be very high. On the other hand, the resistivity cannot be chosen too low, since the quality factor of the resonator is a function of the resistance value. Therefore, the resistivity can be chosen taking into account all the parameters mentioned.

The linear size of the top resonator patch should be less than the size for the most efficient radiation $$\left( < \frac{\lambda}{2\sqrt{\varepsilon}} \right)$$

to prevent and/or reduce spurious radiation (ε is dielectric constant of the PCB substrate, λ is wavelength of the emitted/received signal in free space). The transitional patch may have the shape of a square in an example embodiment, and its linear size may be approximately $$\frac{\lambda}{2\sqrt{\varepsilon}}$$

to provide maximum energy transfer to the top resonator.

Figure 6:
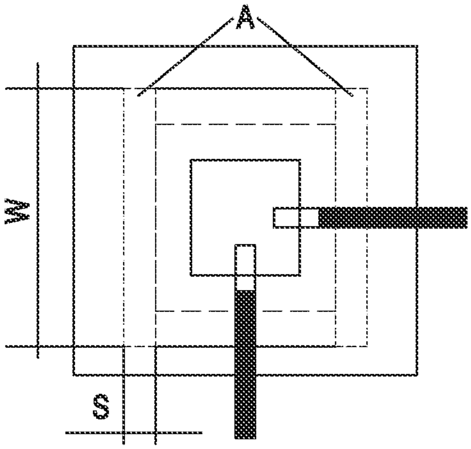
FIG. 6 is a diagram illustrating a top view of a fragment of the printed circuit board containing the termination load to explain the resistive film resistivity calculation according to various embodiments.

The gap parameters between the top patch and the top metal layer can be calculated based on the following condition:

The load resistance of the top patch should be equal to the feeding line impedance, for example 50 ohms. The resistance of each area A (see FIG. 6) should be twice as high, i.e. $R_A$=50*2=100 Ohm.

To achieve this $R_A$, the resistive film must have a resistivity ρ, which can be found from the following formula:

$$\rho = \rho_\square * t$$

where t is the film thickness, $\rho_\square$ is the resistivity of one square, and:

$$\rho_\square = \frac{R}{m},$$

where $m = \frac{s}{W}$ is the number of squares.

For example, in the case when S=0.14 mm, W=0.75 mm, t=0.03 mm, R=100 Ohm, then ρ=0.01 Ohm*m, which corresponds, for example, to the material "Aquadag E".

Figure 7:
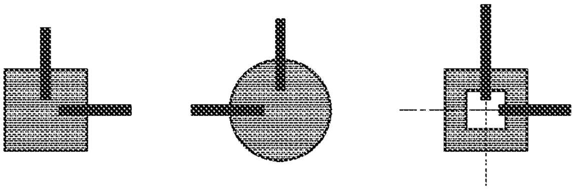
FIG. 7 is a diagram illustrating various examples of the transitional patch according to various embodiments.

In an example embodiment, the transitional patch may be a square. However, in various embodiments, the patch may be in the shape of a circle, a square with a slot in the center, or other suitable axisymmetric shape (see FIG. 7).

Figure 8:
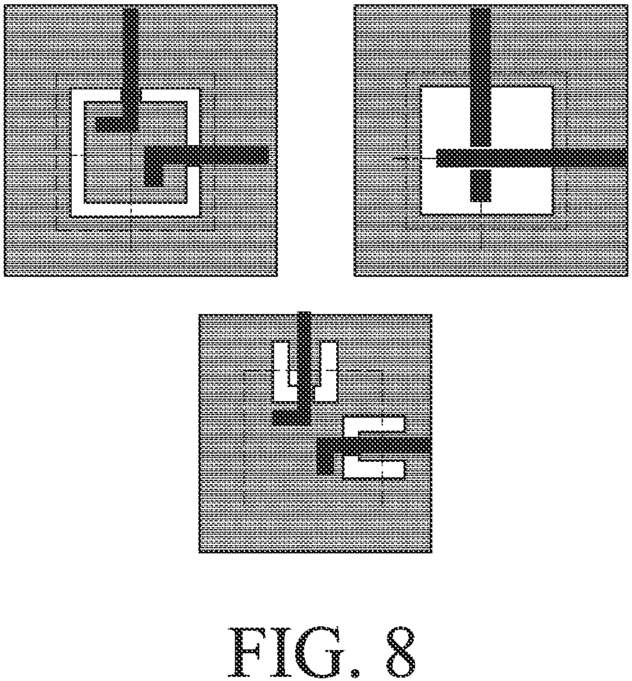
FIG. 8 is a diagram illustrating example feeding lines according to various embodiments.

In various embodiments, feeding lines may be required to be longer than the example embodiment depicted in FIGS. 3A and 3B. In this case, the absence of galvanic contact between the feeding lines must be ensured. The feeding lines in such embodiments may be implemented as shown, for example, in FIG. 8.

Figure 9:
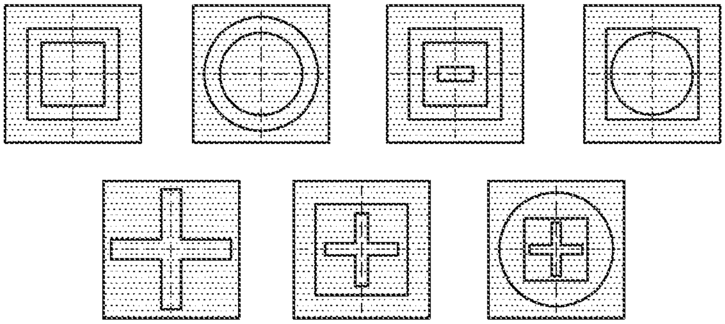
FIG. 9 is a diagram illustrating example top resonator patch shapes according to various embodiments.

In the example embodiment depicted in FIGS. 3A and 3B, the top resonator patch has the shape of a square with a resistive film filling the gap along its perimeter. However, it is worth noting that in various embodiments, the top resonator patch and its surrounding gap may have a different shape, such as a round patch with a circular gap, a round patch with a square gap, a square patch with a slot in the center and a gap shaped like a square, and other shapes that can positively influence the efficiency of energy absorption and provide a more broadband solution (see FIG. 9).

Figure 10:
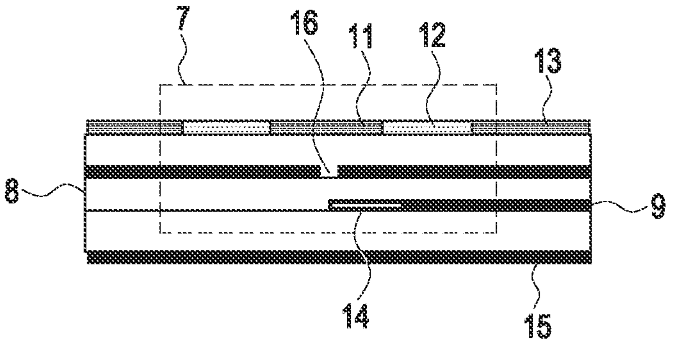
FIG. 10 is a diagram illustrating a side view of a fragment of the printed circuit board containing the termination load according to various embodiments.

In an embodiment in which the termination load comprises a single feeding line, a slot structure 16 may be used instead of the transitional patch 10 to excite the top resonator patch 11 (see FIG. 10). Such excitation through the slot structure provides a wider band of operating frequencies.

Figure 11:
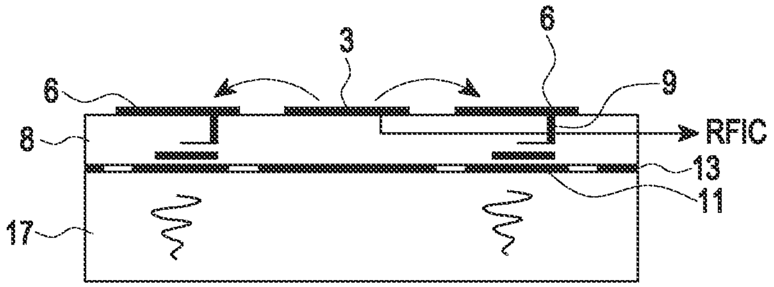
FIG. 11 is a diagram illustrating a side view of a fragment of the printed circuit board containing the termination load according to various embodiments.

In an example embodiment of the present disclosure, illustrated in FIG. 11, the gap is filled with air, instead of a resistive film 12, and for energy absorption, a volume radio-absorbing dielectric material 17 is used, with high dielectric or magnetic losses (for example, tg δ≥0.7), a layer of which is applied over the top layer of the termination load. In such an embodiment, the energy absorbed by the passive elements 6 is transmitted via the feeding line 9 and the transitional patch 10 to the top resonator patch 11, radiated by the patch 11 and absorbed by the volume radio absorbing material 17. Unlike the embodiment with the resistive film, in which the top resonator patch 11 is a low Q resonator with a relatively small field amplitude and in which the energy is absorbed by the film without reaching a significant amount, in this embodiment, the top resonator patch 11 is a high Q resonator (due to the absence of a resistive film and the corresponding losses). In this case, energy can only be released through radiation. As a result, a radiation field is formed and the radiated power is absorbed by the radio absorbing material 17 which has a large loss. There is a spatial absorption of the radiated energy and the release of energy in the form of heat. The greater the thickness of the material 17, the greater the level of parasitic power absorption is.

To ensure energy emission by the top resonator patch, the patch may be sized for maximum efficient emission $$\left(\sim\frac{\lambda}{2\sqrt{\varepsilon}}\right)$$

and may have low losses. This provides a high quality factor of the resonator.

Such an embodiment has a simpler manufacturing process since instead of precisely applying a resistive film around each resonator patch 11, the entire surface is covered with the volume radio-absorbing material 17. The radio-absorbing material is chosen to have the required radiation absorption characteristics in the millimeter and submillimeter range. For example, Eccosorb HR180620 foamy flexible absorber can be used as a volume radio-absorbing material.

Figure 12:
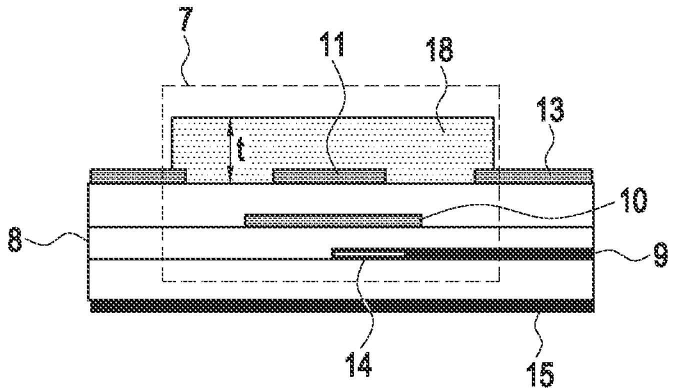
FIG. 12 is a diagram illustrating a side view of a fragment of the printed circuit board containing the termination load according to various embodiments.

In an embodiment of the present disclosure shown in FIG. 12, instead of a resistive film 12 in the energy absorption gap, a radio absorbing coating 18 with high dielectric or magnetic losses (for example, tg δ≥0.7) is used, which is applied into the gap, as well as over the top layer of the termination load. The principle of energy absorption in this embodiment of the termination load is similar to that of the volume absorbent material. An example of a radio-absorbent coating would be a radio-absorbent paint (for example, MF-500 Urethane broadband MagRAM coating) or a radio-absorbent adhesive (for example, ZIPSIL 720 RPM-E). When applying such a coating for energy absorption, a thicker layer is required compared to a resistive film (for example, for paint with tg δ=0.7, the required thickness of the radio absorbing coating is t>0.4 mm). Such an embodiment also has a simpler manufacturing process since it does not require accurate application of a resistive film around each resonator patch 11. When applying a radio absorbing coating, much less stringent requirements for the accuracy of its application can be applied compared to applying a resistive film.

Due to the possibility of contactless loading in accordance with the present disclosure, the termination load, in addition to absorbing energy in the passive elements of the antenna array, can also be used to provide loads for other elements implemented on the inner layers of the PCB, such as power dividers, splitters, etc., to suppress parasitic out-of-phase signals.

Figure 13A:
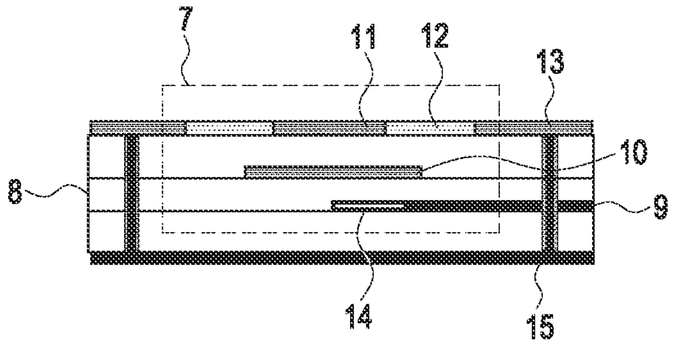
FIG. 13A is a diagram illustrating a side view of a fragment of the printed circuit board containing the termination load with additional shielding elements according to various embodiments.
Figure 13B:
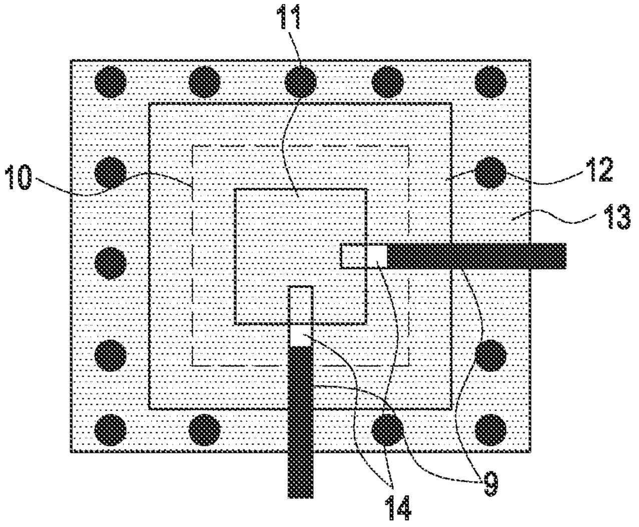
FIG. 13B is a diagram illustrating a top view of a fragment of the printed circuit board containing the termination load with additional shielding elements according to various embodiments.

To suppress parasitic waves propagating in the dielectric substrate of the printed circuit board, in some cases it is advisable to shield the structure of the termination by a plurality of plated through holes (metal pins, VIAs) located around its perimeter, if the structural dimensions allow, as shown in FIGS. 13A and 13B. This reduces crosstalk between the elements of the entire antenna. The distance between the pins should not exceed approximately $$\frac{\lambda}{4\sqrt{\varepsilon}}.$$

In accordance with an example embodiment, an antenna array is provided including active antenna elements and a plurality of passive antenna elements located around the perimeter of the active antenna elements, the passive antenna elements being coupled to the termination load described above to absorb energy of spurious signals.

In accordance with an example embodiment, a power divider is provided, including the termination load described above. Power dividers in accordance with example embodiments may be installed between antenna elements in scanning antenna arrays. The termination load in such dividers is designed to absorb spurious signals caused by phase distortion due to signal reflections from discontinuities. Due to contactless loading of the termination load, the power divider can be implemented on the inner layers of the printed circuit board. Examples of such power dividers are Wilkinson power divider, rat-race power divider, etc.

Thus, the present disclosure provides a simple, reliable and compact termination load which, when applied to an antenna array, can effectively absorb the energy of spurious signals, thereby providing low side lobes and a high protection factor, which positively affects the operating efficiency of the antenna array (speed, range and reliability of data transmission).

The termination load according to the present disclosure may be compatible with AiP (Antenna-in-Package) technology.

The present disclosure may find application in 5G (28 GHz), WiGig (60 GHz), Beyond 5G (60 GHz) and 6G (sub-terahertz) wireless communication systems, near range communication systems (60 GHz, NFC), in wireless data transmission between different modules in modular devices, between components in electronic devices, etc.

It should be understood that although terms such as "first", "second", "third" and the like may be used herein to describe various elements, components, regions, layers and/or sections, these elements, components, areas, layers and/or sections should not be limited by these terms. These terms are used simply to distinguish one element, component, region, layer or section from another element, component, region, layer or section. Thus, the first element, component, region, layer or section may be called a second element, component, region, layer or section without departing from the scope of the present disclosure. As used herein, the term "and/or" includes any and all combinations of one or more of the respective listed positions. Elements mentioned in the singular do not exclude the plurality of elements, unless otherwise specified.

In the above description of the examples, directional terms (such as "above", "up", "below", "down", "top", "bottom", etc.) are used for convenience only in referring to the accompanying drawings.

The functionality of an element specified in the description or claims as a single element may be realized by several components of the device, and conversely, the functionality of elements indicated in the description or claims as several separate elements may be realized by a single component.

The embodiments of the present disclosure are not limited to the embodiments described herein. Basing on the information set forth in the description and knowledge of the prior art, those skilled in the art will appreciate other embodiments of the disclosure which are not apart from the essence and scope of this disclosure.

Elements mentioned in the singular do not exclude the plurality of elements, unless otherwise specified.

It will be understood that the disclosure is not limited to a specific software or hardware implementation, and therefore any software and hardware known in the prior art can be used to implement the disclosure. For example, hardware can be implemented in one or more specialized integrated circuits, digital signal processors, digital signal processing devices, programmable logic devices, user-programmable gate arrays, processors, controllers, microcontrollers, microprocessors, electronic devices, other electronic modules capable of performing the functions described in this disclosure, a computer, or a combination of the above.

According to an embodiment, an antenna array may comprise at least one active element 3 and at least one passive element 6 arranged around the at least one active element 3. The at least one passive element 6 may include at least one feeding line 9 disposed between a first ground layer 13 and a second ground layer 15, a first patch 11 disposed on the same plane as the first ground layer, a second patch 10 at least partially disposed between the at least one feeding line and the first patch, wherein the second patch is configured to be electromagnetically coupled to the first patch and the at least one feeding line and a radio-absorbing material 12, 17, 18 disposed adjacent to the first patch.

According to an embodiment, the at least one feeding line may include an excitation probe 14 configured to be electromagnetically coupled to the second patch.

According to an embodiment, the radio-absorbing material may include a resistive film 12 disposed in a gap between the first patch and the first ground layer.

According to an embodiment, the radio-absorbing material may include at least one of a radio-absorbing dielectric material 17, a radio-absorbing painting 18 or a radio-absorbing adhesive 18.

According to an embodiment, the at least one passive element may include a printed circuit board (PCB) 8. The PCB may include the first ground layer and the second ground layer.

According to an embodiment, a size of the first patch may be less than $$\frac{\lambda}{2\sqrt{\varepsilon}},$$

where ε may be the permittivity of the PCB, λ may be the wavelength of the emitted/received signal in free space.

According to an embodiment, a size of the second patch may be substantially $$\frac{\lambda}{4\sqrt{\varepsilon}}.$$

According to an embodiment, the at least one feeding line may include two feeding lines disposed to be orthogonal to each other.

According to an embodiment, the second patch may have at least one of a square shape, a circle shape, or a square having a slot formed in a center therein.

According to an embodiment, the at least one passive element may include a plurality of plated through holes (VIAs) disposed around the radio-absorbing material and located corresponding to the first ground layer.

According to an embodiment, the at least one passive element may include a printed circuit board (PCB) 8 including the first ground layer and the second ground layer. λ distance between each of the VIAs may be not exceeding $$\frac{\lambda}{4\sqrt{\varepsilon}},$$

where ε is the permittivity of the PCB, λ is the wavelength of the emitted/received signal in free space.

While various example embodiments have been described and shown in the accompanying drawings, it should be understood that such embodiments are illustrative only and are not intended to limit the scope of the disclosure, and that the disclosure should not be limited to the specific arrangements and structures shown and described since various other modifications may be apparent to those skilled in the art.

The features mentioned in various dependent claims, as well as the embodiments disclosed in various parts of the description, can be combined to achieve advantageous effects, even if the possibility of such combination is not explicitly disclosed.

What is claimed is:

1. An antenna array comprising:
at least one active element; and
at least one passive element arranged around the at least one active element, and
wherein the at least one passive element including:
at least one feeding line disposed between a first ground layer and a second ground layer;
a first patch disposed on the same plane as the first ground layer;
a second patch at least partially disposed between the at least one feeding line and the first patch, wherein the second patch is configured to be electromagnetically coupled to the first patch and the at least one feeding line; and
a radio-absorbing material disposed adjacent to the first patch.

2. The antenna array of claim 1, wherein the at least one feeding line includes an excitation probe configured to be electromagnetically coupled to the second patch.

3. The antenna array of claim 1, wherein the radio-absorbing material includes a resistive film disposed in a gap between the first patch and the first ground layer.

4. The antenna array of claim 1, wherein the radio-absorbing material includes at least one of a radio-absorbing dielectric material, a radio-absorbing painting or a radio-absorbing adhesive.

5. The antenna array of claim 1, wherein the at least one passive element includes a printed circuit board (PCB), and
wherein the PCB includes the first ground layer and the second ground layer.

6. The antenna array of claim 5, wherein a size of the first patch is less than $$\frac{\lambda}{4\sqrt{\varepsilon}},$$

where ε is a permittivity of the PCB, λ is a wavelength of an emitted/received signal in free space.

7. The antenna array of claim 6, wherein a size of the second patch is $\lambda/2\sqrt{\varepsilon}$.

8. The antenna array of claim 1, wherein the at least one feeding line includes two feeding lines disposed to be orthogonal to each other.

9. The antenna array of claim 1, wherein the second patch has at least one of a square shape, a circle shape, or a square having a slot formed in a center therein.

10. The antenna array of claim 1, wherein the at least one passive element includes a plurality of plated through holes (VIAs) disposed around the radio-absorbing material and located corresponding to the first ground layer.

11. The antenna array of claim 10, wherein the at least one passive element includes a printed circuit board (PCB) including the first ground layer and the second ground layer, and
wherein a distance between each of the VIAs is not exceeding $$\frac{\lambda}{4\sqrt{\varepsilon}},$$

where ε is a permittivity of the PCB, λ is a wavelength of an emitted/received signal in free space.

* * * * *